March 13, 1956 J. F. JOHNSON 2,738,473
LOAD CENTER BUS BAR ASSEMBLY
Filed Dec. 15, 1954
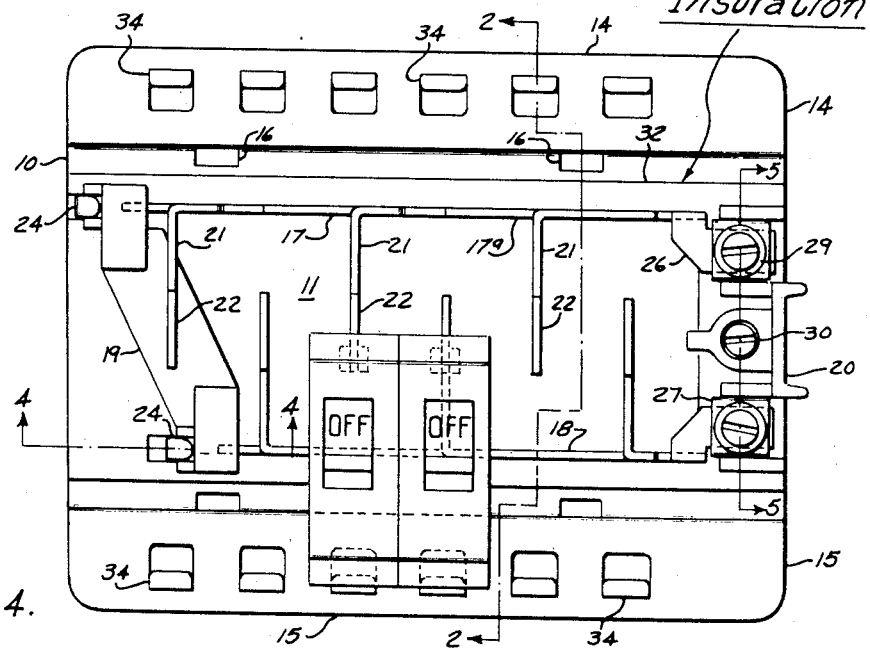
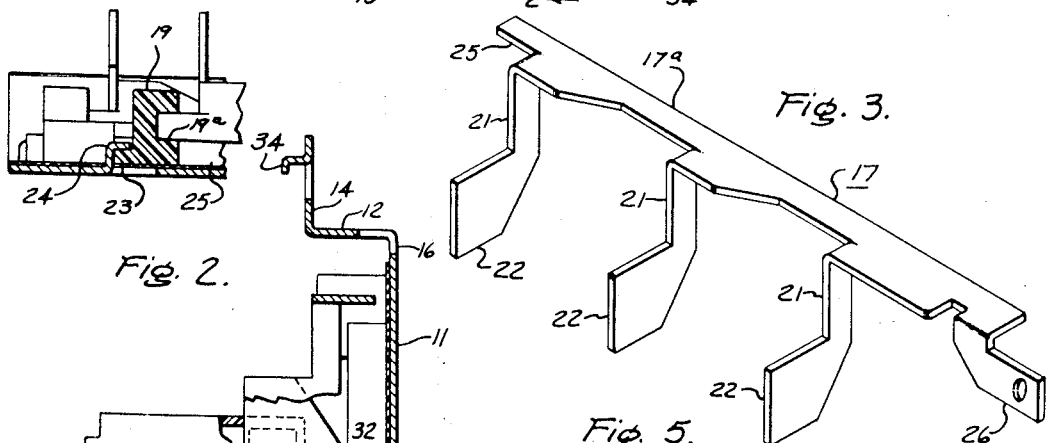
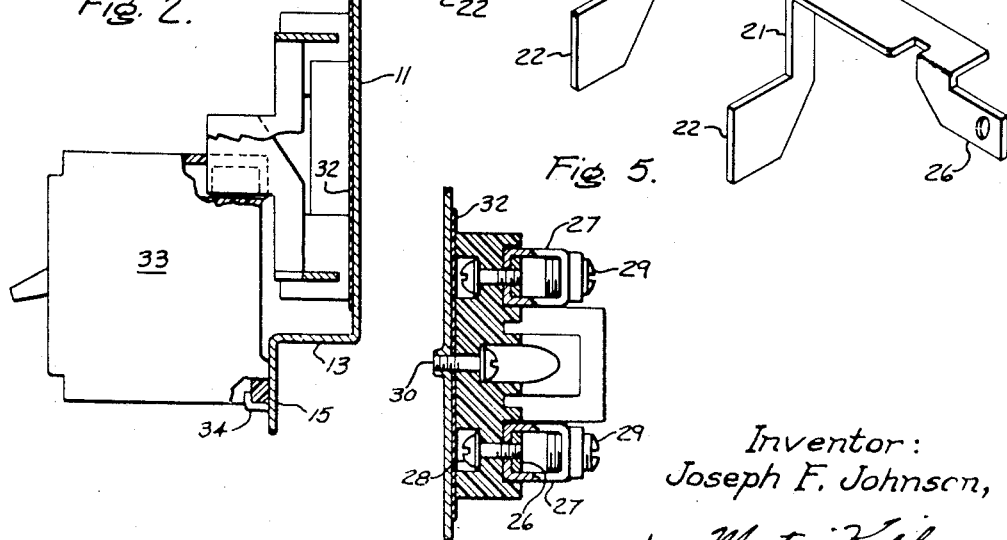
Inventor:
Joseph F. Johnson,
by Martin Kalihan
His Attorney.

United States Patent Office 2,738,473
Patented Mar. 13, 1956

2,738,473

LOAD CENTER BUS BAR ASSEMBLY

Joseph F. Johnson, Plainville, Conn., assignor to General Electric Company, a corporation of New York Application December 15, 1954, Serial No. 475,329

4 Claims. (Cl. 339—22)

My invention relates to electrical panelboards and particularly to panelboards adapted for use with electrical protecting devices, such as used in residential electrical systems.

An important object of my invention is to provide a panelboard having a plurality of relatively closely-spaced bus bars with interleaving portions, the construction of which requires a minimum of insulating barriers or other solid insulating material.

It is a further object of my invention to provide a panelboard having a bus bar construction which shall be easy and inexpensive to manufacture and assemble.

Another object of my invention is to provide a panelboard having a bus bar construction which shall provide maximum physical strength in a first direction and maximum electrical clearance in a second direction transverse to said first direction.

It is a further object of my invention to provide a panelboard having a bus bar construction of the above type which shall accommodate circuit breaker protecting devices of the type disclosed in Patent 2,627,563 issued February 3, 1953, to W. A. Thomas, and assigned to the same assignee as the present invention.

The novel features which are believed characteristic of the invention are set forth in the appended claims. The invention itself, however, together with further advantages thereof, may best be understood by referring to the following description taken in connection with the accompanying drawings in which:

Figure 1 is a front plan view of a panelboard embodying my invention;

Figure 2 is a view of the panelboard of Figure 1 taken on the line 2—2 of Figure 1;

Figure 3 is a view in perspective of one of the bus bars of the panelboard of Figure 1;

Figure 4 is a view of a portion of the panelboard of Figure 1 taken on the line 4—4 of Figure 1 and indicating details of the insulating support for the bus bars.

Figure 5 is a view of a portion of the panelboard of Figure 1 taken on the line 5—5 of Figure 1 and showing details of the insulating support at the terminal end of the bus bars.

My invention is shown in one form as embodied in a panelboard comprising a support or tray 10 formed of sheet metal and having a back wall 11, generally parallel side walls 12 and 13, and outwardly extending flange portions 14 and 15 attached thereto, and having openings 16 therein for facilitating the mounting thereof within a suitable enclosure by mounting means not shown.

A pair of electrically conducting bus bars 17 and 18, are mounted on the support 10 by means of insulators 19 and 20. Each of the bus bars 17 and 18 includes an elongated main bus portion such as 17a and branch circuit connecting portions 21 having terminal connecting blades 22. The insulating support 19 is retained in place of the suport 10 by having projecting feet 23 thereof retained under lugs 24 at one end of the support as indicated particularly in Figure 4. Each of the bus bars 17 and 18 have one end portion 25 adapted to seat in recesses 19a in insulating support 19. The terminal end 26 of each of the bus bars extends generally parallel to the back wall 11 and lies within generally tubular connector 27 which in turn is supported upon the insulator 20, the parts being attached thereto by suitable means such as screw 28. A terminal clamping screw 29 is adapted to clamp a conductor within the connector 27. The insulating support 20 is retained in place on a support 10 by screw 30 which passes therethrough and threads into the support 10. A sheet 32 of suitable insulating material such as fiber is retained in place between the support 10 and the insulators 19 and 20 and underlies the bus bar assembly.

It is to be noted that there is only a single retaining element which must be manipulated in order to retain the entire bus bar assembly and its insulating supports in place on the support 10, this element being screw 30. Thus in assembling the structure, the insulating sheet 32 is first laid on the support 10, the retaining lugs 24 projecting through corresponding openings therein. The insulating block 19 is then slid under the lugs 24, the flat terminal ends 26 of the bus bars 17 and 18 together with corresponding connectors 27 are attached to the insulating support 20 by means of screws 28; this subassembly is then mounted in place by inserting the ends of the bus bars in the recesses 19a of the block 19 and the block 20 is attached to the base 10 by the screw 30. This mounting arrangement is very simple but nevertheless serves to rigidly support the opposite ends of the bus bars so as to prevent substantially all twisting thereof and furnish a firm dependable assembly.

Each of the bus bars 17 and 18 is fabricated from a single flat and relatively thin sheet of metal and has its branch connecting portions formed as right-angle or L-shaped portions lanced out from the main bus portion and bent through an angle of 90° to extend perpendicular to the plane of the main bus portion. Each bar is then assembled on the support 10 with the plane of its major flat surface perpendicular to the back wall 11 of the support. The complete fabricated bus assembly, therefore, is made up of sheet metal portions each of which have its major flat surface perpendicular to the back wall 11. Moreover, the three components comprising a main bus portion such as 17a, a branch connecting portion such as 21 with its blade 22, and the back wall 11 are arranged to lie in three mutually perpendicular planes.

Electrical control devices or circuit breakers 33 are each adapted to be supported upon the flanges 14 or 15 by having one end wall thereof retained under hooked lugs 34 and female electrical plug-in type connectors adjacent its opposite end wall engaging and supported by the connecting terminal blades 22 of the bus bars 17 and 18. The construction of the electrical control devices 33 may, for instance, be similar to that disclosed in the aforementioned Thomas Patent 2,627,563, but other similarly mountable devices may, of course, be used. The branch connecting portions 21 of the bus bars 17 and 18 are all preferably made the same length and the bus bars 17 and 18 are positioned so that the branch connecting portions interleave and the terminal connecting blades 22 lie in flatwise alignment in a row extending generally parallel to the bus bars 17 and 18 and substantially midway between them. Each of the connecting blades 22 is preferably adapted to make connection with two of the electrical control devices 33, which when connected extend in endwise abutment transversely of the panel. For illustrative purposes, only two such control devices have been shown in place in the panel of Figure 1. It will be understood, however, that the construction shown is adapted to make connection with two such control devices at each terminal blade, thereby accommodating six such control devices for each bus bar or a total of twelve for the panelboard. It will also be understood that the bus bars 17 and 18 may be extended lengthwise to accommodate any desired number of such control devices. It is pointed out that the bus bars 17 and 18 are formed of flat sheet metal by simply blanking out the desired form from a sheet of metal and bending the branch connecting portions at right angles to the main portion of the bus bar. The configuration of the bus bars 17 and 18, moreover, is such that two such bus bars may be blanked out from a single piece of conducting material by having branch connecting portions alternating or interleaving when in the flat condition whereby little or no material is wasted in the manufacturing process. The form and configuration of the bus bars as bent up of flat sheet material positioned on edge with respect to the support 10 is such as to afford maximum physical and electrical clearance between the bus bars 17 and 18, not only at their major elongated portions, but also at their branch connecting portions. At the same time, due to the edgewise mounting, a conductor having a relatively large cross-sectional area may be used to conduct the current without excessive heating. By means of this construction, maximum advantage is taken of air-spacing, to achieve adequate insulation, making it unnecessary to fabricate and mount additional insulating barriers between the bus bars or between the branch connection portions.

Although I have described above one particular embodiment of my invention, many modifications thereof may be made by those skilled in the art. I intend, therefore, by the appended claims to cover all such modifications as fall within the true spirit and scope of the invention.

What I claim as new and desire to secure by Letters Patent of the United States is:

1. An electric panelboard comprising a support having a generally planar back wall, at least two bus bars mounted in electrically insulated spaced relation on said back wall and having main bus portions and branch connecting portions terminating in terminal blades for plug-in type connection to an electrical device, said main bus portion, said branch connecting portions and said terminal blades all being formed of flat relatively thin sheet metal the major surfaces of which extend substantially perpendicular to said back wall of said support.

2. The panelboard as set forth in claim 1 wherein the bus bars comprise two generally parallel bus bars, the branch connecting portions of each of said bus bars extending generally perpendicular thereto from one of said bus bars toward the other, the said branch connecting portions being spaced apart along the length of each of said bus bars and interleaving with the branch connecting portions of the other of said bus bars, the terminal blades of said branch connecting portion lying in flatwise alignment in a row extending generally parallel to said two bus bars and substantially midway between them.

3. The panelboard as set forth in claim 1 wherein the bus bars comprise two generally parallel bus bars, the branch connecting portions of each of said bus bars extending generally perpendicular thereto from one of said bus bars toward the other, the said branch connecting portions being spaced apart along the length of each of said bus bars and interleaving with the branch connecting portions of the other of said bus bars, the terminal blades of said branch connecting portions lying in flatwise alignment in a row extending generally parallel to said two bus bars and substantially midway between them, the said main bus portions, branch connecting portions and terminal blades of each of said bus bars being formed from a single piece of flat, relatively thin metal.

4. The panelboard as set forth in claim 1, wherein mounting means is provided for the bus bars comprising two spaced-apart blocks of insulating material mounted on the back wall of the support, one of the said blocks having recesses in one face thereof, each of said bus bars having one end inserted in one of said recesses, said recess comprising a blind hole shaped to conform closely to the cross-sectional outline of said bus bar at its said end, whereby substantially all movement of said end of said bar is prevented in all directions except outwardly from said recess, the other of said blocks having conductor connecting means, and means fastening said bus bars and said conductor connecting means together and to said other block whereby substantially all movement of the terminal end of said bus bars is prevented and whereby substantially all movement of said bus bar outwardly from said recesses in said first block is also prevented.

References Cited in the file of this patent
UNITED STATES PATENTS

| | | |
|---|---|---|
| 1,582,957 | Avery | May 4, 1926 |
| 2,570,229 | Hammerly et al. | Oct. 9, 1951 |